June 6, 1967 J. L. WAISMAN 3,323,403

PRE-LOAD INDICATING WASHER

Original Filed Oct. 12, 1951

INVENTOR.
JOSEPH L. WAISMAN
BY
AGENT

United States Patent Office 3,323,403
Patented June 6, 1967

3,323,403
PRE-LOAD INDICATING WASHER
Joseph L. Waisman, Sherman Oaks, Calif., assignor to Douglas Aircraft Company, Inc., Santa Monica, Calif., a corporation of Delaware
Continuation of applications Ser. No. 250,997, Oct. 12, 1951, and Ser. No. 246,307, Dec. 19, 1962. This application Jan. 11, 1965, Ser. No. 424,749
6 Claims. (Cl. 85—62)

This application is a continuation of application, Ser. No. 250,997, filed Oct. 12, 1951, and application Ser. No. 246,307, filed Dec. 19, 1962, both now abandoned.

This invention relates to washers such as are employed with bolts and similar fasteners. It includes improvements providing a multi-part washer having coacting parts configured primarily to visually and tactilely indicate the attainment in the fastener shank of a predetermined installation tension engendered by tightly installing the fastener, as to connect faying surfaces together.

Since fastener-sets that include this invention can be detightened readily to the maximum safe tension thereof without having to stop short of such tension because of the previous inability to ascertain the exact tension in the fastener, the invention obviates both loose connections and overly pre-loaded connections. Loose connections render the fastener liable to become rapidly fatigued to the failure point under shocks thereon as well as endangering the structural integrity of the jointure and connected parts.

The invention is hence particularly well adapted to airplane use, for, heretofore in the art, fastener installation tensions have been approximately gauged either by the reading of the torque wrench or by actual measurement of the elongation of the fastener.

It is notorious that torque wrench readings usually enable ascertainment of the fastener tension only within about 50% of the actual installation tension or pre-load and sometimes these readings vary as much as 100% from the actual tension in the bolt. The consequences mentioned above hence ensue.

This invention provides a combined fastener-tension indicating device and novel washer-unit which obviates the aforesaid disadvantages in that, for one reason, it provides an exact indication of the "pre-load' which is not rationally capable of either underloading or overloading. It enables fasteners to be tightened to a tension lying within 95% of the yield-strength of the fastener. Actually, the tight jointures established by means of the invention have a yield-strength considerably higher than that of the looser jointures of the prior art.

In its minimum essentials, the invention may physically consist of a single annular spacer disposed coaxially of the elongate fastener, radially close to its shank, and axially interposed between either the head or the nut of the fastener and the adjacent structure. This spacer, in order to adapt it to function dually as a tension-gaging device and as a washer, is given a critical axial excess of length over that which it requires in order to serve as a washer and is composed of a plastically yieldable material. With a given radial dimension, its plastic yield strength and the excess length are substantially directly related to the design installation tension of the fastener. When the fastener has been set up to its design tension, the spacer spaces the head or nut of the bolt an axial distance from the sub-adjacent or superadjacent connected surface a predetermined amount which can be either axially gauged as by a "feeler"; be peripherally gauged, as by a calipering micrometer, after its plastic compression has radially expanded it a predetermined, visually estimable extent; or by visually compared, axially, to a predetermined datum mark on adjacent structure.

Although this single-piece form of the invention has several merits over other forms thereof, it is preferred to embody the inventive concepts in a form which consists, broadly, or radially-bipartite, axial length differentiated spacer and index means. Usually these means consist of concentric annular members, the inner one being axially longer than the outer one and disposed coaxially of the fastener near its shank and sub-adjacent or super-adjacent either the head or the nut of the fastener. This inner member is composed of such a material and has such a hardness and relative dimensions as to render it plastically deformable axially and radially of the jointure in a substantailly direct relationship to the predetermined installation tension of the fastener.

The other member is spaced concentrically outwardly of the first member and has a composition, hardness and relative dimensions which render it elastically deformable if it deforms at all. Actually, it has a substantially fixed length and serves as a stop-gage for the indexing deformation of the plastically deformed member. Its substantially fixed length is less than that of the inner member by an amount approximately directly related to the total yield of the inner member and when a bolt head or nut crushes through the inner member and bottoms on it in substantial co-planarity therewith, it indicates the installation, or "pre-load," tension in the bolt. This bottoming may be determined by finger-rotating the outer member to determine the peripheral or axial binding; or by an axial-separation-distance compressive deflection gage to determine the approach of the bolt-head to the sub-adjacent structure.

Since the outer annulus is purely elastically deformable whereas the inner annulus is entirely plastically deformable, most of the final load is accepted by the relatively small area of the "plastically flowing" inner annulus, near the shank of the bolt, although the outer annulus accepts some of the final load.

It will be observed that the invention, in addition to providing a novel gage and method of gaging, as well as affording a novel bipartite, radially differentiated final washer, also provides a novel method of making this novel washer in situ under the bolt head or nut.

Other embodiments of these concepts and other definite advantages and merits of the invention will either be made manifest, or become apparent, hereinafter.

The now-preferred embodiments of these and other inventive concepts are shown in cooperation with the head of a bolt in the accompanying drawings and this combination is described hereinafter in conjunction with these drawings, but merely to further clarify the invention and to disclose some of the many physical forms it can take, and in no sense limits the scope of the invention exactly to that which is shown in the drawings or is described in the following specifications.

In these drawings.

Figure 1:
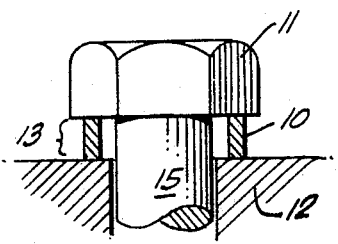
FIGURE 1 is a view partly in section and partly in elevation of the single-annulus form of the device in its initial association with a bolt.
Figure 2:
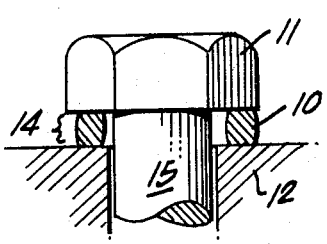
FIGURE 2 is a similar view of this form of the device after the bolt has been tightened to its installation tension.

In the embodiment illustrated in FIGURES 1 and 2, the invention takes the form of a single hollow cylindrical member 10, composed of a medium-carbon steel and heat-treated or otherwise endowed with a hardness represented by a number less than 800 on the Vickers metallic hardness scale, so that it is plastically, as contrasted to elastically, deformable under the compression action of the bolt 11 and the sub-adjacent structure 12. The material may be of any composition having a plastic yield strength not less than 2000 p.s.i. The initial axial extent 13 of member 10 is sufficiently greater than its final axial extent 14 to enable its plastic crushing by this amount between the head and the structure to visually or tactilely indicate the installation tension of the bolt. With a given radial dimension its yield strength and its initial excess length are substantially directly related to the design installation tension of the bolt. That is, a given desired tension in the bolt shank 15 will produce a predetermined axial crushing of the washer 10 equal to the axial difference between dimension 13 and dimension 14.

The compressed height of member 10 can be estimated by eye and compared to a datum, or a conventional compressive-deflection gage, or "feeler," can be initially inserted and rotated to determine whether the head has bottomed on it in the relative positions indicated in FIGURE 2.

Figure 3:
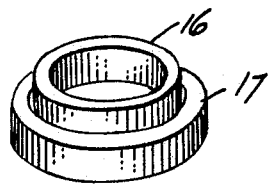
FIGURE 3 is a perspective view of a two-piece form of the device.
Figure 4:
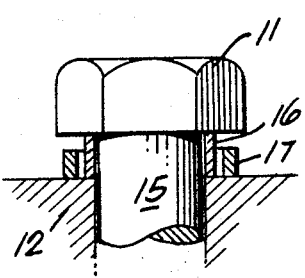
FIGURE 4 is a view partly in section and partly in elevation of this form of the device in its initial condition of association with a bolt, the axial spacing of the components being, as in the subsequent figures, exaggerated for purposes of clarity.
Figure 5:
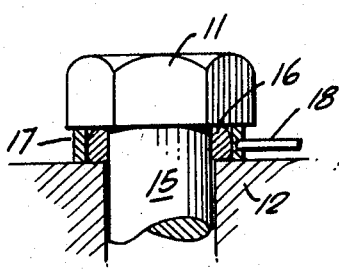
FIGURE 5 is a similar view of this form of the invention in its final condition.

In the embodiment illustrated in FIGURES 3–5, inclusive, the device consists of a two-piece unit dually acting as a gauge and washer and comprises an inner washer-piece 16, here shown as a hollow cylinder arranged coaxially adjacent the shank of the bolt between the bolt-head and sub-adjacent structure. An outer washer piece 17 is arranged concentrically outwardly of member 16.

Member 16 is initially axially longer than member 17 by an amount the axial and radial absorption of which indicates the bolt's installation tension.

The member 16 is composed, for example, of a medium carbon steel heat treated to confer thereon a hardness represented by a number less than 800 on the Vickers metallic hardness scale and having a plastic yield strength preferably in excess of 2000 p.s.i., although it may be of a composition and hardness and yield strength selected to vary with the predetermined installation tension of the fastener. These facts, coupled with its predetermined axial excess in length and its predetermined radial thickness, enable it to plastically yield axially and radially under compression, and to assume a crushed, or permanently set, or plastically deformed, condition under axial pressure proportioned to the bolt-tension when the bolt is tightened to complete the connection. It may have the same composition, hardness, yield strength per square inch, and radial wall thickness as the outer annulus, but must be axially more elongate than said annulus. The differential in axial length, when member 16 is composed and heat-treated as above stated, is preferably of the order of 10–15%; that is, the inner annulus is axially 10–15% longer than the outer annulus 17. This differential is exaggerated in the drawings for clarity of illustration. The differential is usually sufficient to allow the establishment of a final strain lying within the plastic range for the particular material and hardness selected. Also, the hardness, composition, diameter and wall thickness of the inner annular member are such that the desired pre-tension average stress lies within the plastic range of the material chosen.

Although member 17 is axially shorter than member 16, it is of an elastically deformable nature and is of considerably greater diameter than the latter. It may be composed of a material harder than the member 16 or it may be softer than member 16, or of equal hardness. Its wall thickness may be equal to that of member 16, greater than that of member 16, or less in thickness.

The difference in axial lengths of members 16 and 17 is calibrated to the maximum safe installation tension of the fastener in such a manner as to accurately indicate the fastener tension when this length differential is abolished by the compressive plastic axial shortening and radial thickening of the inner member.

The inner member 16 of the washer-unit may have a hardness and interrelated diametral thickness and length dimensions which are varied according to the size of the fastener and the design installation tension thereof. Whatever its harness and dimensional values and proportions may be, its accurate, direct response to the fastener tension results from the fact that it, like member 10, is plastically deformable and the stress vs. strain curve of a plastically deformable member rapidly reaches a point of inflection in a short length of the strain axis, that is, the x-axis. The curve then levels off and runs substantially parallel to the strain axis, or x-axis, thus forming a "plateau." This phenomenon is the "yielding" phenomenon characteristic of certain steels and other alloys. Accordingly, increments in the strain created in the inner member 16 of the unit beyond the beginning of this plateau by shortening of the fastener as by advancing the nut on its thread, that is, within a short distance below the upper end of member 16, produce no correspondingly large increments on the y-axis, that is, the stress axis. Thus, no large increments occur in the internal stresses of member 16.

Hence incremental loads required to tighten the fastener are not in equal proportion to the length decrements or strain, and do not vary substantially from each other. Thus the fastener unit and the present spacer-and-gauge-device may safely vary, in production, from design dimensions by the usual tolerance amounts without affecting the accuracy of the device. This is due to the fact that the "plateau" is broad enough so that a large initial variation in member 16 dimensions will not result in an appreciable change in the load required to achieve strains in the "plateau" region.

In comparison to any other indicating means for indicating stresses, such as those employing analogues of the Belleville spring and based upon elastic failure or deformation, the present device is so much critically shorter, lighter, less voluminous and bulky as to enable it to be used in locations and for purposes unavailable to the aforesaid elastic-failure devices.

The device is relatively easy to fabricate and calibrate accurately with the predetermined optimum gage tension, for one reason, because it can be accurately fabricated the predetermined amount longer axially, than its calibrated or desired final length.

When the predetermined installation tension of the bolt has been reached, the bolt-head will bottom on the upper surface of the washer-member 17. Thus, at least one of the laterally extending pressural members is reactively spaced from the adjacent surface of the bolt-connected structure by a laterally divided, radially differential washer. The inner component of this washer consists of the plastically crushed, or permanently set annulus 16 which also has a smaller contact area than the conventional washer of the same initial size. The major portion of the bolt-load is thus concentrated near the shank. Hence, the final article produced by the bolt-tightening is a radially differential washer which applies less stress-moment for a given "load" to the bolt-head than a conventional washer of the same dimensions.

The radial gap between the two washer members may be designed sufficiently large to prevent the outer periphery of the compressively crushed and radially expanded inner member from radially binding upon the inner periphery of the outer washer member in order to obviate the introduction of a "drag" factor into the reading of the device. However, this gap is not essential since the device may be so designed that when the bolt has been tightened enough to bulge the inner washer radially outwardly into contact with the outer washer, the bolt-head will have bottomed on the outer component, immobilizing the latter.

It is not likely that the present device will damage the elements contacted thereby, but if exceptionally soft material is to be contacted, an ordinary disk-washer may be axially interposed between the tension-indicating members and the substructure.

To facilitate the employment of the "feeler" method of ascertaining the bottoming of the bolt head on the component 17 of the washer, the outer member 17 may be provided, as shown in FIGURE 5, with a radially outwardly extending handle 18 for rotating same and this handle may be formed integrally with member 17 or detachably connected thereto at its inner end, as desired.

Figure 6:
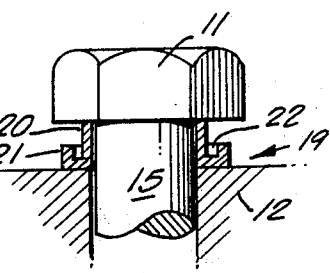
FIGURE 6 is a similar view of another single-piece form of the invention in its initial condition.
Figure 7:
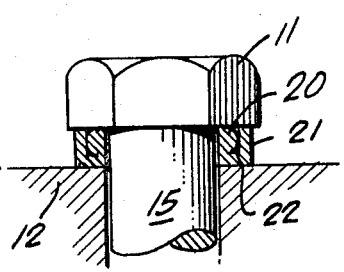
FIGURE 7 is a similar view of the form of FIGURE 6 in its final condition.

In FIGURES 6 and 7 there is illustrated a form of the invention which consists of a single piece of material 19 configured as a radially outwardly successively stepped-down washer. The major purpose of this form of the invention is to prevent the entry of chips etc. into the space between the radially inward and outward components of the device of FIGURES 3, 4 and 5 from below same, there being no likelihood, under the circumstances, that foreign matter can enter through the top thereof. The single piece of material 19 has its upper face composed of two annuli 20 and 21, radially separated by a space 22, the inner one, 20, being initially axially longer than the outer one, 21 by an amount pre-calibrated with the bolt's installation tension. The portion 20 yields axially under the bolt-installation load and allows the bolt-head to bottom on the outer member 21 when the desired tension has been reached. The radial expansion of member 20 is absorbed by space 22 as shown in FIGURE 7.

Figure 8:
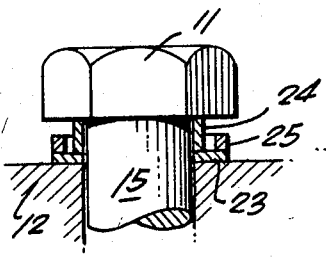
FIGURE 8 is a similar view of still another single-piece form of the invention in its initial condition.
Figure 9:
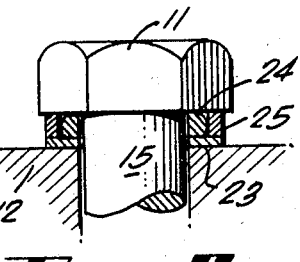
FIGURE 9 is a similar view of this form of the invention in its final condition.

In FIGURES 8 and 9, the same objective is in view and is achieved by providing a centrally perforate basal member 23 composed of a relatively rigid material and having a diameter sufficient to accommodate inner and outer washer members 24 and 25 like those designated 16 and 17 of FIGURES 4 and 5 and radially spaced thereon as, and for the purposes, aforesaid. The members 24 and 25 are rigidly united at their lower ends, as by brazing or soldering, to support member 23 and function in substantially the same manner as aforedescribed.

The invention contemplates many other configurational embodiments thereof and it is hence to be understood that the forms shown and described have been presented merely in order to illustrate the inventive principles. Such presentation thus in no way limits the invention, the scope of which is defined in the following claims.

I claim:

1. Tension indicating means for threaded fasteners of the type which includes an elongate shank connectively passing through members to be united and being terminated on at least one end thereof by a member having a surface extending radially of the shank transforming a tension load in the fastener to a compression load against the adjacent one of the members to be united, comprising: a hollow right-cylinder washer means surrounding said shank and disposed between said radially extending surface and said adjacent one of the members, the washer means being of a hard ductile metal deformable, in compression, at one rate per increment of loading within its elastic range and at a substantially greater rate than said one rate per increment of loading beyond its elastic range in its plastic range; said washer means having an initial relaxed height and being compressed under and by said radially extending surface to a second lesser height under a load which is equal to the tension load to be established and maintained in the fastener, the cross-sectional thickness of the washer means and the initial height thereof being of such ratio that a compression load applied thereto in reducing the washer means to its lesser height effects a bulging of its cross section whereby it thickens on one side radially inwardly toward the shank and radially outwardly on its other side; said washer means in being reduced to its lesser height undergoing deformation in its plastic range; said washer means being spaced away from the shank sufficiently to accommodate the radial inward bulging of the washer means; and a gauge member outwardly adjacent the washer means, said gauge member being an annulus surrounding said washer means and also disposed between the radially extending surface and the adjacent one of the members, the height of said gauge member, measured axially of the shank, being equal to said second lesser height of the washer means whereby the reduction of the height of the washer means to its second lesser height upon attainment of the tension load to be established in the fastener is indicated by the gauge member being gripped between the radially extending surface and said one of the members to be united; the inner surface of the gauge member being spaced from the outer surface of said washer means to accommodate, unrestrained, the outward bulging of the washer means occurring during its compression.

2. Tension indicating means primarily for fasteners of the type which includes an elongate shank connectively passing through members to be united and provided with a member having a surface extending radially of the shank transforming a tension load in the fastener to a compression load against the adjacent one of the members to be united, comprising: washer means having an upright peripheral wall surrounding said shank and disposed between said radially extending surface and said adjacent one of the members, the washer means being of a hard ductile metal deformable, in compression, at one rate per increment of loading within its elastic range and at another rate than said one rate per increment of loading beyond its elastic range in its plastic range; said washer means having an initial relaxed height and being compressed under and by said radially extending surface to a second lesser height under a load which is equal to the tension load to be established and maintained in the fastener; the initial cross sectional thickness of the washer means bearing a sufficient ratio to the initial height thereof to prevent buckling under columnar load; the compression load applied thereto in reducing the washer means to its lesser height effecting a radial bulging and a consequent increase in its cross sectional thickness; said washer means in being reduced to its lesser height undergoing deformation in its plastic range; and a gauge member outwardly adjacent the washer means and having an upright peripheral wall surrounding said washer means and also disposed between the radially extending surface and the adjacent one of the members; the height of the gauge member, measured axially of the shank, being equal to said second lesser height of the washer means whereby the reduction of the height of the washer means to its second lesser height upon attainment of the tension load to be established in the fastener is indicated by the gauge member being gripped between the radially extending surface and said one of the members to be united; the inner surface of the gauge member being spaced from the outer surface of said washer means to accommodate, unrestrained, the outward bulging of the washer means occurring during its compression.

3. Tension indicating means primarily for fasteners of the type which includes an elongate shank for securing together a plurality of members, at least one of said members having an opening with the shank of the fastener passing therethrough; said fastener bearing a formation having a laterally extending pressure-applying surface in spaced, generally parallel relation to the surface of said one member to transform a tension load in the fastener to a compression load against said one member; said indicating means comprising an annular body having a radially extending base and an axial passage therethrough normal to said base; an inner, annular wall integral with said base and extending axially from the inner margin of one side of said base to define the boundary of said passage; and an outer, annular wall integral with said base, extending axially from the same side of said base, and spaced radially outwardly from and arranged coaxially with said inner wall; said body surrounding said shank and being disposed between said pressure-applying surface and said one member; said body being formed of a hard ductile metal plastically deformable under high compression loads; said inner wall having an initial relaxed axial length and being compressed under and by said pressure-applying surface to a final lesser axial length under a load which is equal to the tension load to be established and maintained in the fastener; the attainment of said final axial length thus serving to indicate the establishment of the desired tension load in the fastener; the initial cross sectional thickness of the inner wall bearing a sufficient ratio to the initial axial length thereof to prevent buckling under axial load; the compression load applied to said inner wall in reducing it to its final lesser axial length effecting a radial bulging and a consequent increase in its cross sectional thickness; said inner wall, in being reduced to its final lesser axial length, undergoing deformation in its plastic range; the gradual increase in the cross sectional area of said inner wall as its axial length is reduced gradually presenting increased resistance to further yielding under load whereby, when the design tension of the fastener has been attained, the inner wall not only indicates said condition but exerts great and increasing resistance to further axial shortening under working loads; said outer wall also being disposed between said pressure-applying surface and said one member but spaced radially outward of said inner wall a sufficient distance to accommodate, unrestrained, the outward bulging of the inner wall occurring during its compression down to its final lesser axial length; the axial length of said outer wall being equal to the final axial length of said inner wall, whereby shortening of the inner wall to its final length is indicated by elimination of the gap between the pressure-applying surface and outer wall.

4. Tension indicating means primarily for fasteners of the type which includes an elongate shank for securing together a plurality of members, at least one of said members having an opening with the shank of the fastener passing therethrough; said fastener bearing a formation having a laterally extending pressure-applying surface in spaced, generally parallel relation to the surface of said one member to transform a tension load in the fastener to a compression load against said one member; said indicating means comprising a body having an axial passage therethrough surrounded by a peripheral, axially extending wall; said body surrounding said shank and disposed between said pressure-applying surface and said one member; said body being formed of a hard ductile metal plastically deformable under high compression loads; said body having an initial relaxed axial length and being compressed under and by said pressure-applying surface to a final lesser axial length under a load which is equal to the tension load to be established and maintained in the fastener; the attainment of said final axial length thus serving to indicate the establishment of the desired tension load in the fastener; the initial cross sectional thickness of the wall bearing a sufficient ratio to the initial axial length thereof to prevent buckling under axial load; the compression load applied to said wall in reducing the body to its final lesser axial length effecting a radial bulging and a consequent increase in the cross sectional thickness of the wall substantially uniformly around its periphery; said body, in being reduced to its final lesser axial length, undergoing deformation in its plastic range; the gradual increase in the cross sectional area of said wall as its axial length is reduced gradually presenting increased resistance to further yielding under load whereby, when the design tension of the fastener has been attained, the body not only indicates said condition but exerts great and increasing resistance to further axial shortening under working loads; a gauge member having an axial passage therethrough surrounded by a peripheral, axially extending wall; said gauge member surrounding said body and also disposed between said pressure-applying surface and said one member; the height of the gauge member, measured axially of the shank, being equal to said final axial length of the body, whereby the reduction of the axial length of the body to its final axial length upon attainment of the tension load to be established in the fastener is indicated by the gripping of the gauge member between the pressure-applying surface and said one member; the inner surface of the gauge member being spaced from the outer surface of the body to accommodate, unrestrained, the outward bulging of the body occurring during its compression; web means extending radially between said body and said gauge member to maintain them in substantially coaxial relation; and bonding means securing said web means to said body and said gauge member.

5. Tension indicating means primarily for fasteners of the type which includes an elongate shank for securing together a plurality of members, at least one of said members having an opening with the shank of the fastener passing therethrough; said fastener bearing a formation having a laterally extending pressure-applying surface in spaced, generally parallel relation to the surface of said one member to transform a tension load in the fastener to a compression load against said one member; said indicating means comprising a body having an axial passage therethrough surrounded by a peripheral, axially extending wall; said body surrounding said shank and disposed between said pressure-applying surface and said one member; said body being formed of a hard ductile metal plastically deformable under high compression loads; said body having an initial relaxed axial length and being compressed under and by said pressure-applying surface to a final lesser axial length under a load which is equal to the tension load to be established and maintained in the fastener; the attainment of said final axial length thus serving to indicate the establishment of the desired tension load in the fastener; the initial cross sectional thickness of the wall bearing a sufficient ratio to the initial axial length thereof to prevent buckling under axial load; the compression load applied to said wall in reducing the body to its final lesser axial length effecting a radial bulging and a consequent increase in the cross sectional thickness of the wall substantially uniformly around its periphery; said body, in being reduced to its final lesser axial length, undergoing deformation in its plastic range; the gradual increase in the cross sectional area of said wall as its axial length is reduced gradually presenting increased resistance to further yielding under load whereby, when the design tension of the fastener has been attained, the body not only indicates said condition but exerts great and increasing resistance to further axial shortening under working loads; and a gauge member having an axial passage therethrough surrounded by a peripheral, axially extending wall; said gauge member surrounding said body in substantially coaxial relation therewith; the final maximum lateral dimension of said body when bulged in response to compression by said pressure-applying surface under a load which is equal to the tension load to be established and maintained in the fastener having a predetermined value correlated to the amount of said tension load; the lateral dimension of the passage in said gauge member having the same predetermined value, whereby said gauge member accommodates, unrestrained, the outward bulging of the body occurring during its compression up to the pre-selected tension load in the fastener and binds upon the body upon attainment of said tension load.

6. Tension indicating means primarily for fasteners of the type which includes an elongate shank for securing together a plurality of members, at least one of said members having an opening with the shank of the fastener passing therethrough; said fastener bearing a formation having a laterally extending pressure-applying surface in spaced, generally parallel relation to the surface of said one member to transform a tension load in the fastener to a compression load against said one member; said indicating means comprising a body having an axial passage therethrough surrounded by a peripheral, axially extending wall; said body surrounding said shank and disposed between said pressure-applying surface and said one member; said body being formed of a hard ductile metal plastically deformable under high compression loads; said body having an initial relaxed axial length and being compressed under and by said pressure-applying surface to a final lesser axial length under a load which is equal to the tension load to be established and maintained in the fastener; the attainment of said final axial length thus serving to indicate the establishment of the desired tension load in the fastener; the initial cross sectional thickness of the wall bearing a sufficient ratio to the initial axial length thereof to prevent buckling under axial load; the compression load applied to said wall in reducing the body to its final lesser axial length effecting a radial bulging and a consequent increase in the cross sectional thickness of the wall substantially uniformly around its periphery; said body, in being reduced to its final lesser axial length, undergoing deformation in its plastic range; the gradual increase in the cross sectional area of said wall as its axial length is reduced gradually presenting increased resistance to further yielding under load whereby, when the design tension of the fastener has been attained, the body not only indicates said condition but exerts great and increasing resistance to further axial shortening under working loads; and a gauge member having an axial passage therethrough surrounded by a peripheral, axially extending wall; said gauge member surrounding said body and also disposed between said pressure-applying surface and said one member; the height of the gauge member, measured axially of the shank, being equal to said final axial length of the body, whereby the reduction of the axial length of the body to its final axial length upon attainment of the tension load to be established in the fastener is indicated by the gripping of the gauge member between the pressure-applying surface and said one member; the inner surface of the gauge member being spaced from the outer surface of the body to accommodate, unrestrained, the outward bulging of the body occurring during its compression.

References Cited

UNITED STATES PATENTS

| 994,892 | 6/1911 | Tschudy | 85—50 |
| 2,188,356 | 1/1940 | Jeans et al. | 85—62 |
| 2,464,152 | 3/1949 | Ralston | 85—62 |
| 3,174,386 | 3/1965 | Lewis | 85—62 |

FOREIGN PATENTS 608,067   4/1926   France.

EDWARD C. ALLEN, *Primary Examiner.*